(12) United States Patent
Musser

(10) Patent No.: US 6,240,822 B1
(45) Date of Patent: Jun. 5, 2001

(54) ADJUSTABLE PRECISION INDEXING JIG

(76) Inventor: Ronald L. Musser, 318 Coventry Dr., Stockton, CA (US) 95207

( * ) Notice: Subject to any disclaimer, the term of this patent is extended or adjusted under 35 U.S.C. 154(b) by 0 days.

(21) Appl. No.: 09/363,241

(22) Filed: Jul. 28, 1999

(51) Int. Cl.[7] .................................................. B26D 7/06
(52) U.S. Cl. ......................... 83/446; 83/468.2; 83/468.7; 144/145 R; 144/287
(58) Field of Search ............................. 83/438, 446, 468, 83/468.7, 468.2; 144/287, 145 R

(56) References Cited

U.S. PATENT DOCUMENTS

| | | | |
|---|---|---|---|
| 3,612,118 | * 10/1971 | Davis | 144/27 |
| 4,248,115 | 2/1981 | Brodbeck et al. | 83/435.1 |
| 4,341,247 | 7/1982 | Price | 144/287 |
| 4,552,193 | * 11/1985 | Armas | 144/144.5 |
| 4,558,618 | 12/1985 | Bachmann et al. | 83/438 |
| 4,593,590 | 6/1986 | Gray | 83/438 |
| 4,655,445 | * 4/1987 | Morse | 144/198 A |
| 4,679,605 | 7/1987 | Picciuto | 144/117 R |
| 4,846,036 | 7/1989 | Metzger, Jr. et al. | 83/438 |
| 4,887,653 | 12/1989 | Thomas | 144/286 R |
| 4,899,795 | 2/1990 | Hackett | 144/138 |
| 5,020,578 | 6/1991 | Jennings | 144/145 R |
| 5,038,486 | * 8/1991 | Ducate, Sr. | 83/437 |
| 5,181,446 | 1/1993 | Theising | 83/438 |
| 5,337,641 | * 8/1994 | Duginske | 83/468 |
| 5,586,929 | 12/1996 | Butcher et al. | 451/213 |
| 5,617,909 | * 4/1997 | Duginske | 144/253.1 |
| 5,722,308 | 3/1998 | Ceroll et al. | 83/438 |
| 5,797,193 | * 8/1998 | Amend et al. | 33/614 |

* cited by examiner

Primary Examiner—M. Rachuba

(57) ABSTRACT

A novel precise, multiple indexing jig used in conjunction with power tools, especially a power saw, is disclosed. The jig includes a longitudinal indexing rod that precisely locates and supports by pivotal articulation, a plurality of swing arms. The swing arms can be rotated onto the table and used as stops to assist in positioning a work piece on the device that is to be worked at a specific location, such as the cut length for a saw. When they would be in the way of a work piece, they can be rotated away from the table. The indexing rod is positioned parallel to a guide fence that also locates the work piece. A series of location supports are also located on the indexing rod and further support the swing arms. An alternative embodiment enables the guide fence to also index with the swing arms, thereby increasing the structural stability of the swing arms when they are positioned as stops.

7 Claims, 4 Drawing Sheets

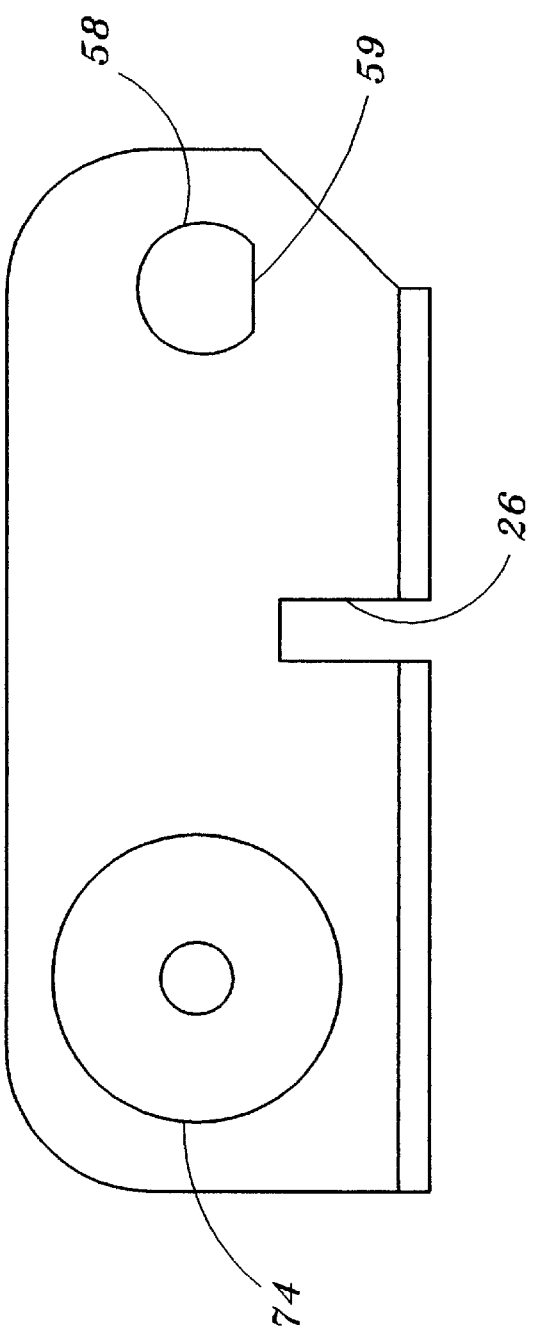

ADJUSTABLE PRECISION INDEXING JIG

BACKGROUND OF THE INVENTION

1. Field of the Invention

The invention herein relates to a workplace jig and more particularly to a jig that is capable of multiple indexing with fine adjustment for precision location.

2. Overview of Prior Art

The use of metal and wood working machinery have long found a place in industry. This presence has filtered down into the home in the case of home handymen and craftsmen that desire to do home repairs or light industrial work on their own. As such, variations to many of the more common tools are sought, each appealing to a specific target of users and price points that can be supported by that group. Many of the common tools, such as saws, drills etc., all have a common feature of a flat base or table with which to support the work piece. This is essential in that all measurements are referenced from that flat surface.

In the case of saws, many times there is an additional flat surface with which to support or guide the work piece. This enables a desired, usually straight, cut. This flat surface is referred to as a fence. Another referenced dimension refers to the length of the cut work piece. This is usually assisted by a stop. The stop can be secured to the fence and relocated as necessary to cut the work piece to the desired length. These being critical components of the process, it does not stand to wonder that various devices have been created in an attempt to assist the craftsman in these areas.

One such attempt was made by Ceroll et al and disclosed in U.S. Pat. No. 5,722,308. This is a precise method of moving the gate a specified distance from the saw while keeping it parallel to the blade. This is especially important in the case of rip cuts on large pieces of wood. No stops are evident or suggested in this disclosure.

A simplified version of the previously disclosed is shown in U.S. Pat. No. 4,558,618 as disclosed by Bachmann et al. This also is a movable fence but is moved by hand and locked in place by the friction applied by mating parts as provided by a screw knob.

Two similar disclosures, also relating to an adjustable fence for a saw are disclosed by Theising and Metzger, Jr. et al in U.S. Pat. Nos. 5,181,446 and 4,846,036, respectively. Both disclosures show a locking mechanism that is used in conjunction with a table saw. Both show a locking mechanism for the fence and the former is a self aligning version to secure the fence in place.

Another adjustable fence was disclosed by Gray in U.S. Pat. No. 4,593,590. This is a simplified version that involves a screw knob to secure a linkage that controls the length of the fence. In one embodiment, the fence telescopes, the male portion of the fence will be set further away from the work piece than the female portion, by the thickness of the metal of the female portion.

In a disclosure by Brodbeck et al, in U.S. Pat. No. 4,248,115 shows a fence on a sliding table and also on a flat table. Both fences are adjustable and set perpendicular to one another. The novelty being a set of tilting arbor arms to support large objects.

Hackett, in U.S. Pat. No. 4,899,795 disclosed a table that can be placed on the table of a table saw and used as an indexing jig. Front and rear fences are used to support centers to hold a work piece that can be rotated and remain parallel to the saw blade. For a similar purpose, Jennings in U.S. Pat. No. 5,020,578 disclosed a jig that includes a forward and a rearward plate. These plates are adapted to include collinear holes such that a work piece positioned there between, a portion being received by the holes, could rotate there about. This mechanism is mounted to a carriage and follows a pattern over a saw blade in a table saw.

A device disclosed by Picciuto in U.S. Pat. No. 4,679,605 includes a fence and an adjustable stop. Ironically, this device is intended to make components of a fence. The device also includes a clamping device that holds the work piece against the fence and is positioned for length by the moveable stop.

A disclosure by Thomas in U.S. Pat. No. 4,887,653 includes a fence guide that travels on a guide bar. This combination enables the work guide to be positioned so as to make straight cuts on a table saw. This as with all of the other disclosures, this must be changed for each particular setting.

Price, in U.S. Pat. No. 4,341,247 disclosed an extension table to be used with a saw. The assembly includes a vertical guide or fence that supports a stop that can be moved to various positions on the extension member.

A saw with a stop, which includes an adjustment screw, is disclosed by Butcher et al in U.S. Pat. No. 5,586,929. A work piece is positioned in the v-block with a threaded block for a stop adjacent thereto. The threaded portion received a screw, the end of the screw being capable of acting as a stop.

SUMMARY OF THE INVENTION

The object of the disclosed invention is to provide a rapid and accurate multi-indexing capability from a single jig. This jig can be used with a variety of tools in the workplace but is most advantageous for use with a type of saw. More common to industry, but also used in garage wood shop, multiple pieces of any particular cut a material are used. From the studs in the frame of the wall of a building to legs on a table, these comprise many of a common length part. The disclosed invention is extremely useful is repeatedly locating a work piece relative to the saw blade, thereby providing consistent cut lengths of material.

The invention also has the ability to allow for rapid modification due to multiple stop arms that can be rotated into position or out of the way of the work piece without altering the length position. This is extremely useful in that standard lengths of material seldom, if ever, work out to maximum number of parts with minimal scrap. To optimize this combinations of different lengths of parts must be taken from each stock length of material. This means changing the stop, typically requiring unproductive time and increasing the possibility of error with every setting of the stop. The disclosed invention solves these problems with a cost effective solution for individuals or small companies that cannot justify the expense of computer numeric controlled saws.

BRIEF DESCRIPTION OF THE DRAWINGS

FIG. 5 is a front view of a swing arm as shown in FIG. 4.

FIG. 6 is a section view of the indexing rod along line 6—6 as shown in FIG. 4.

FIG. 7 is a section view of the indexing rod along line 7—7 as shown in FIG. 4.

DETAILED DESCRIPTION OF THE PREFERRED EMBODIMENT

In response to the current inadequacies of products in the marketplace, the following disclosure is made thus showing and describing a novel improvement relative to the current state of the art. What is herein disclosed is a device that is inexpensive to manufacture and that brings with it the relative speed, accuracy and thereby efficiency that until now has only been available with computer numeric controlled (CNC) systems. These CNC systems are not financially feasible for the small businesses nor individuals.

Figure 1:
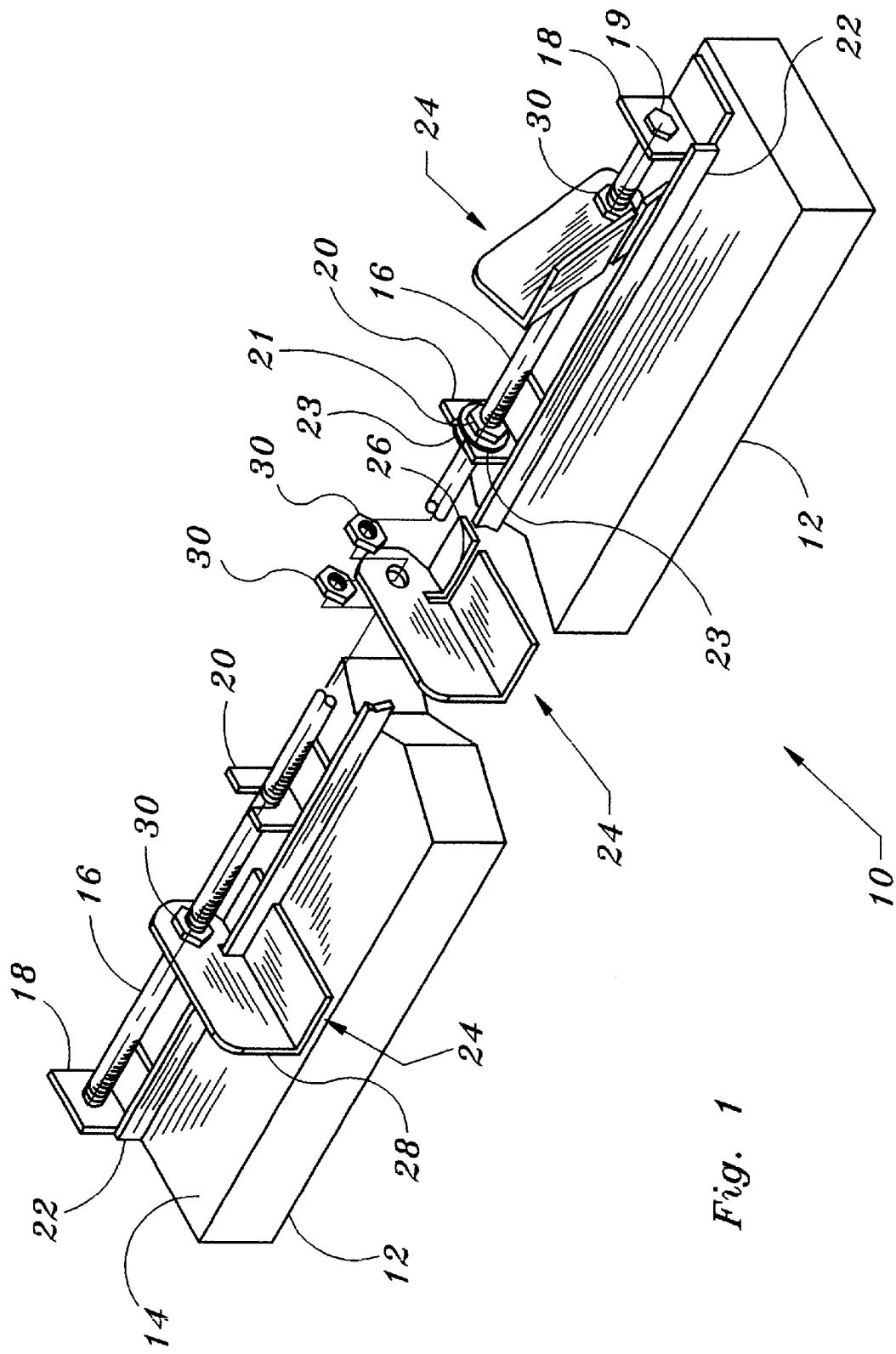
FIG. 1 is a isometric view of an adjustable precision indexing jig produced in accordance with the preferred embodiment of the present invention.

Referring to the drawings, FIG. 1 shows a precision indexing jig 10 as it would typically appear. The center section has been removed to facilitate description of the components of the invention. The base frame 12 is of a rigid material such as metal or wood and has a smooth and flat upper surface 14. An indexing rod 16 is mounted to the base frame 12 by way a two support ears 18, one located at each end of the base frame 12. The method of attachment can be any form that is known in the art. Here a threaded fastener 19 is used to secure the rod 16 to the ear 18. It has been found that a nut and washer, one on each side of the ear 18 is also a desirable method of attachment.

The support ears 18 can be mounted to the base frame 12 in any method that is common to the art. Threaded fasteners or welding, for metal parts, are preferable methods. The placement of the support ears must allow for a reasonably consistent height of the indexing rod 16 relative to the base frame 12. To assist with this task, additional notched support ears 20 can be used, as is shown here. The indexing rod 16 can be secured to the notched ears 20 by way of nuts 21 and also washers 23, although any known fastening method can be used. The support of the rod 16 by the surface of the notch, without any fasteners, can also be used, as it is shown here on one of the ears 20. The use of the ears 20 is not intended to be limiting.

Positioned substantially parallel to the indexing rod 16 is a fence 22. The fence is a substantially longitudinal member that is also durable in nature. The fence is used to provide a flat surface with which to index and guide a work piece. These work pieces will be repeatedly engaged by the fence and must maintain structural integrity and rigid support. Preferably, the fence is constructed of cold formed mild carbon steel, but again the material is not critical to the function of the invention.

The disclosed invention also has a plurality of stops in the form of swing arms 24. These swing arms 24 are pivotally mounted on the indexing rod 16 so as to allow for angular displacement of the swing arms 24. The swing arms have a slot 26 that allows to be received by the fence 22 when the swing arms 24 are moved to the down position, as shown in the swing arm 24 toward the left end of FIG. 1. The swing arms 24 have a flat surface 28 that, in this down position, provides a suitable surface to position a work piece relative to one end of the invention. This flat surface is only valuable if the swing arms 24 do not move after repeated forces as applied to them from work pieces being hit against them. This problem has been solved by releasably securing the swing arms 24 to the indexing rod 16. One method, as disclosed here, is by use of a threaded indexing rod and at least two threaded nuts 30, one on each side of the swing arm 24. When the nuts 30 are advanced toward each other, the swing arm 24 is securely captured there between.

The adjustment of the threaded indexing rod 16 makes the swing arms capable of being infinitely adjustable in position. Several swing arms 24 can each be set in their respective positions and when one would obstruct the placement of the work piece, the swing arm 24 in question can be rotated up and away from the upper surface 14 of the base frame 12. This is illustrated by the swing arm 24 toward the right end in FIG. 1. Since the nuts 30 do not need to be moved, the position relative to an end of the invention, the swing arm 24 will not be altered by rotating it. Friction between the nuts 30 and the contacting surface of the swing arm 24 keeps the swing arms 24 in their desired angular orientation without altering their relative positions. This allows for a multitude of indexing positions to be made, used and maintained without constant resetting and remeasuring, thus saving time for the user.

Figure 2:
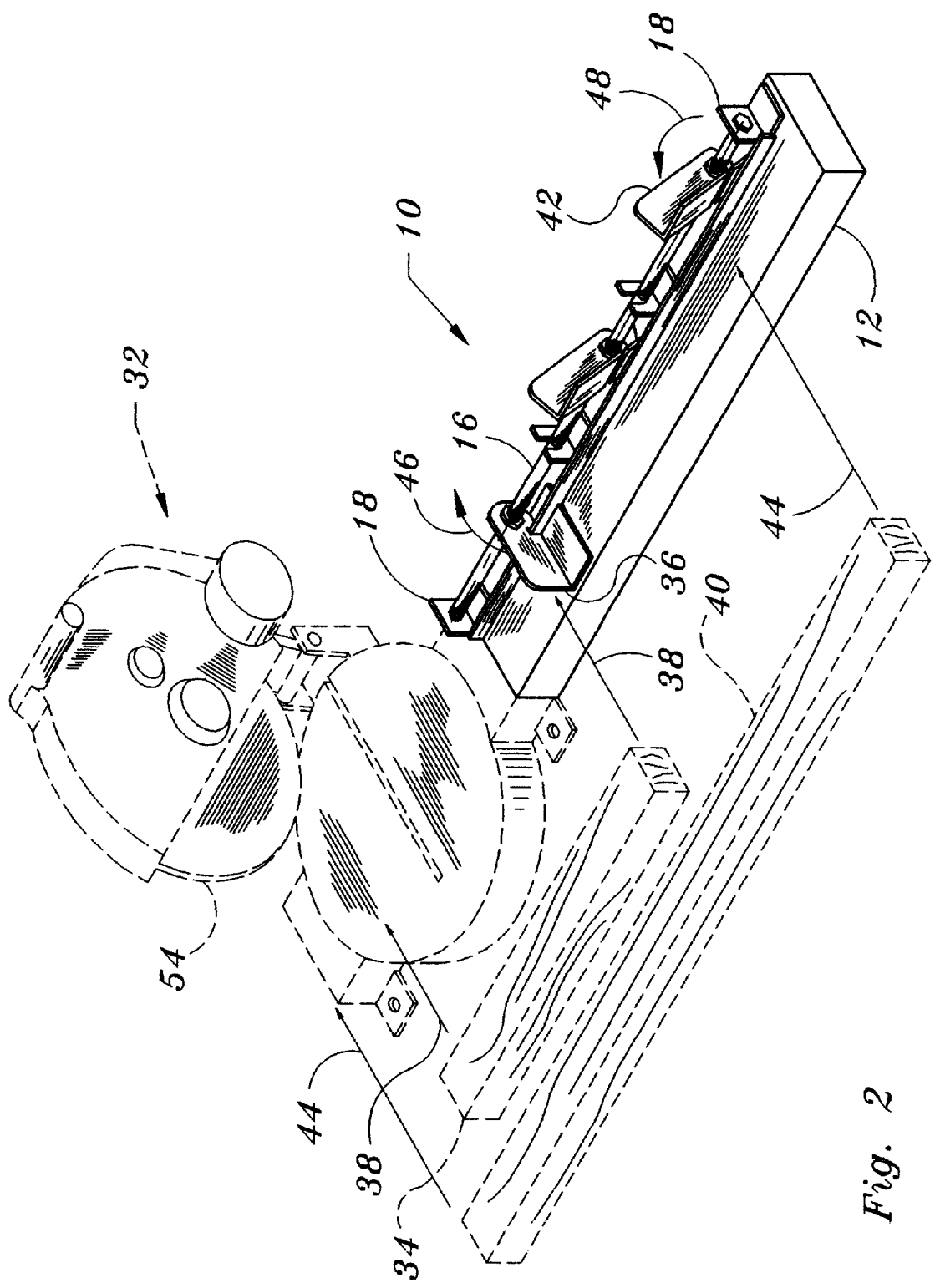
FIG. 2 is a isometric view of an adjustable precision indexing jig, shown as it would typically be used with a circular chop saw, the jig produced in accordance with the preferred embodiment of the present invention.

Though indexing jigs are used in a variety of applications in the area of fabrication or manufacturing, typical examples are a drill press, welding jigs and most commonly, a saw. The saw is typical in that the blade is mounted to be a consistent distance from the edge of the Jig, thereby each stop can be made a specific distance from the blade. This provides specific cut lengths. This example is illustrated in FIG. 2 where the jig is mounted to a chop saw 32. Here, a short work piece 34 is shown to be positioned against the short swing arm 36, as depicted by the arrows 38. The next desired cut is for the long work piece 40 which is to be placed against the long swing arm 42 as depicted by arrows 44. In order for this to happen, the short swing arm 36 must be rotated back, as directed by arrow 46 to a position like that presently shown of the long swing arm 42, which will in turn be rotated down, as designated by the arrow 48, to a position similar to that presently displayed by the short swing arm 36. This "flip flopping" can be repeatedly done as deemed necessary by the user, for numerous consistent cuts, without remeasuring the distance from the blade to the stop each time. What is shown here is a traditional "right handed" arrangement with respect to the saw 32. Since the invention is modular and can be attached or moved to any of a number of devices, a similar device could be mounted to the left side of the saw 32 or other device, thus making a left handed jig. This would be advantageous for left handed persons.

Figure 3:
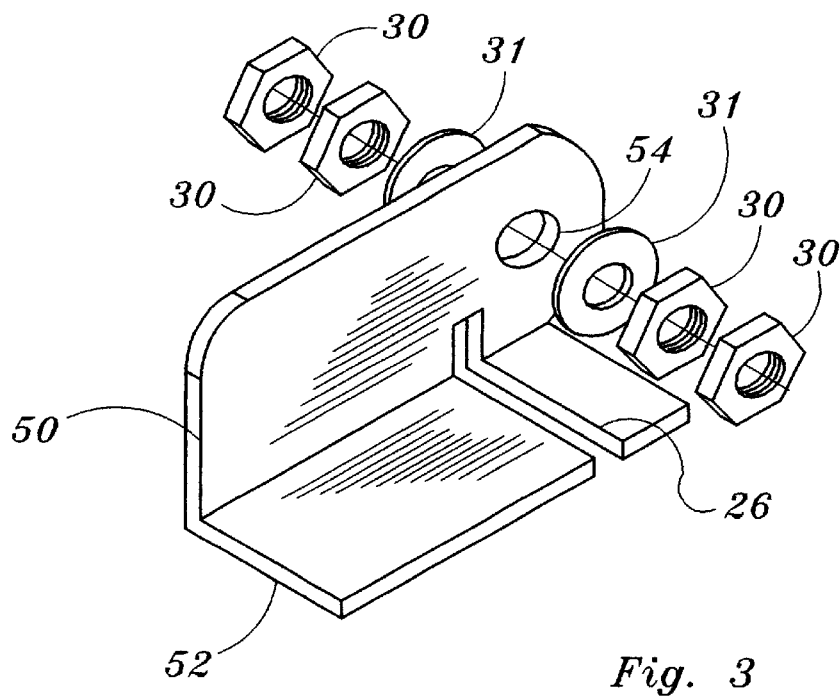
FIG. 3 is a isometric view of a swing arm and two fasteners used as location supports, these being a portion of an adjustable precision indexing jig produced in accordance with the preferred embodiment of the present invention

More detail of a swing arm is shown in FIG. 3. The swing arm is preferably constructed in a right angle form, thus defining a vertical portion 50 and a horizontal portion 52. Though this is not necessary to the function of the invention, in most cases the vertical portion 50 will be desired to fit perpendicular to the base of the device which is then parallel to the saw blade 54 (shown in FIG. 2). This is the only way to allow for a specific cut length regardless of the thickness of the material being cut. The slot 26 is provided to allow room for the fence when the swing arm is in the down position. The hole 54 allows for the indexing rod (not shown) to pass through and the nuts 30, with the flat washers 31, secure the swing arm to the indexing rod. This "double nutted" arrangement as shown here, has been found to be preferable to the single nut version, as was shown in FIG. 1. Though both systems are functional, the double nut locks the nuts 30 in place so they do not move when the swing arms rotate against the nuts 30 when the swing arms are rotated about the indexing rod. This is also aided by the thrust bearing function of the flat washers 31.

Figure 4:
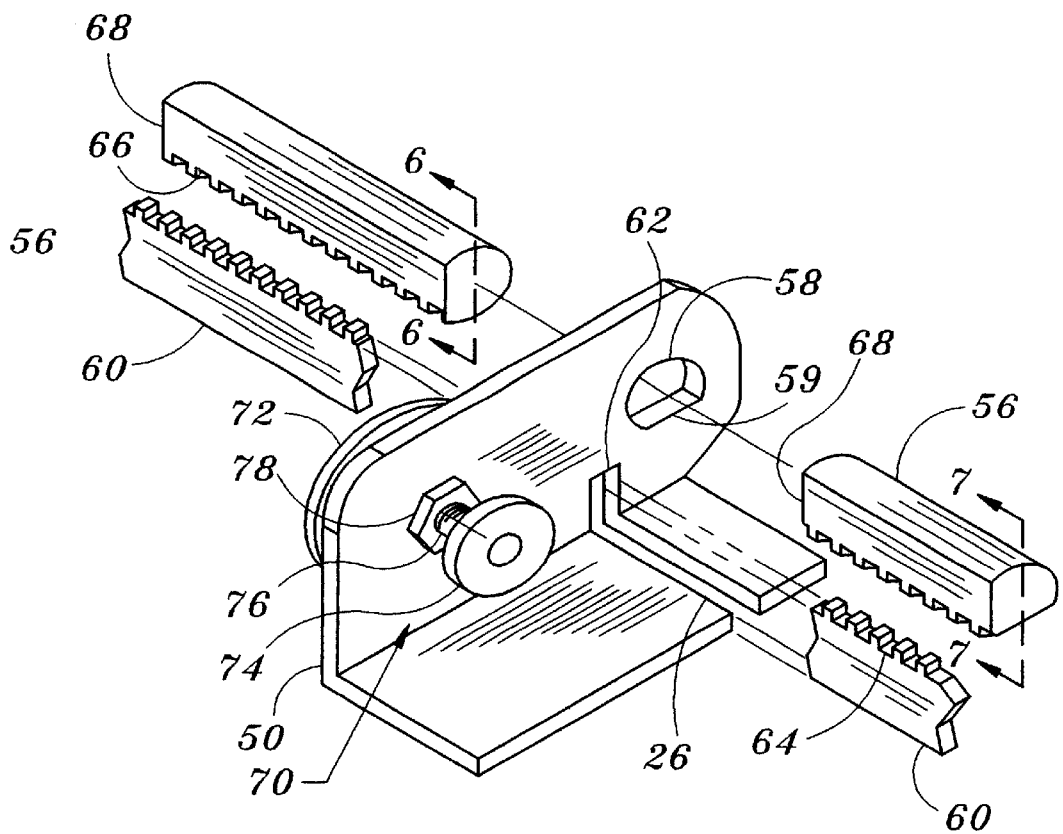
FIG. 4 is a isometric view of a swing arm, indexing rod, and fence of an adjustable precision indexing jig produced in accordance with a variation of the preferred embodiment of the present invention

An alternative to the previously disclosed is shown in FIG. 4. Here the indexing rod is a notched indexing rod 56 and the opening 58 in the swing arm has a flat edge 59 on one side. The notched fence 60 functions as a fence, as previously disclosed, but also acts to further support the swing arm. This is done by providing the upper edge 62 of the slot 26 to be received by the notches 64 in the upper portion of the notched fence 60. At the same relative position of the swing arm, the flat edge 59 of the opening 58 is received by the notches 66 in the notched indexing arm 56. To move the swing arm it is rotated, as previously illustrated, until the flat edge 59 of the opening 58 rotates out of the notch 66 of the notched indexing rod 56 and aligns with the flat edge 68 on same. This allows free movement along the longitudinal axis of the notched indexing rod 56 until the swing arm is in the desired location. Then the swing arm is rotated down, thus engaging the flat edge 59 of the opening 58 and the top edge 62 of the slot 26 in the notches, 66 and 64 respectively, locking it in place.

Because this version as shown in FIG. 4 has a finite number of positions for each swing arm, a fine adjustment 70 is included. This fine adjustment allows for movement of a vertical member 72 relative to the vertical portion 50 of the swing arm. This can be accomplished in a variety of ways. The method shown here is by use of a threaded channel in the vertical portion 50 with a knob 74 attached to a threaded portion 76 that provides displacement of the vertical member 72. A nut 78 is shown as a jam nut to secure the threaded portion 76 and attached vertical member 72 to the swing arm.

More detail as the specific of the locking mechanism of the previously disclosed is shown in FIG. 5–FIG. 7. In FIG. 5 the swing arm is shown with the opening 58 with the flat edge 59 and slot 26. FIG. 6 shows a section of the notched indexing rod, as shown in FIG. 4, which includes a full rounded lower portion (the section not through a notch 66). This rounded lower portion obstructs movement of the swing arm due to interference with the flat portion 59 of the opening 58. When the swing arm is rotated, the flat portion 59 of the opening 58 can be made to align with the flat portion 68 of the notched indexing rod 56, thereby allowing them to move with respect to each other.

The section as shown in FIG. 7 shows a section of the notched indexing rod 56 through its respective notch 66. Here it can be seen that the notch in the indexing rod 56 provides a lower flat edge 80 that articulates with the flat edge 59 of the opening 58. The shape of the remaining portions of the indexing rod 56 and opening 58 do not allow for extraneous movement when in this position and to further facilitate rigid placement, the slot 26 in the swing arm is also supported by the notched fence. This combination creates a rigid support while allowing for rapid movement of the swing arms during setup.

All combinations of the elements of the disclosed are considered to be part of this disclosure. The location supports can equally be comprised of notches in the indexing rod that secure directly to the swing arm or as a combination of a threaded indexing rod used with threaded fasteners. The use of the fence to further support and secure the swing arms while in the down position, and the use of a secondary fine adjustment can also be used in any combination. The variations and combinations are infinite in nature and the specifics of the disclosed is not considered to be limiting to the scope of the disclosed invention.

What is claimed is:

1. An adjustable precision indexing jig comprising:

a frame providing a substantially flat surface;

a substantially longitudinal indexing rod, thus providing a longitudinal axis;

at least two supports, secured to said frame, receiving said indexing rod, thus mounting said indexing rod securely to said frame in a predetermined orientation;

a substantially straight guide fence secured to said frame and positioned substantially parallel to said longitudinal axis of said indexing rod;

a plurality of swing arms each with a flat portion, the swing arms being pivotally secured to said indexing rod; and a plurality of location supports on said indexing rod, each of said location supports restricting movement of at least one of said plurality of swing arms along said longitudinal axis of said indexing rod.

2. The indexing jig as described in claim 1, wherein said indexing rod is threaded and said location supports are threaded nuts, articulating with said indexing rod.

3. The indexing jig as described in claim 1, wherein each of said plurality of location supports is comprised of a pair of threaded nuts, one each side of each of said swing arms, whereby advancing each of said nuts toward each swing arm, capturing same.

4. An adjustable precision indexing jig comprising:

a frame providing a substantially flat surface;

a substantially longitudinal indexing rod, thus providing a longitudinal axis;

at least two supports, secured to said frame, receiving said indexing rod, thus said indexing rod securely to said frame in a predetermined orientation;

a substantially straight guide fence secured to said frame and positioned substantially parallel to said longitudinal axis of said indexing rod;

a plurality of swing arms, the swing arms being pivotally secured to said indexing rod such that a portion of at least one swing arm creates a stop adjacent to said guide fence; and a plurality of location supports on said indexing rod, each of said location supports restricting movement of at least one of said plurality of swing arms along said longitudinal axis of said indexing rod.

5. The indexing jig as described in claim 4, wherein each of said plurality of swing arms is further comprised of a planer region that when positioned adjacent to said guide fence is perpendicular to said guide fence.

6. The indexing jig as described in claim 4, wherein said indexing rod is threaded and said location supports are threaded nuts, articulating with said indexing rod.

7. The indexing jig as described in claim 4, wherein each of said plurality of location supports is comprised of a pair of threaded nuts, one each side of each of said swing arms, whereby advancing each of said nuts toward each swing arm, capturing same.

* * * * *